July 4, 1967 H. ALLEN 3,329,448
PIPE HANGING APPARATUS
Filed Aug. 24, 1964 3 Sheets-Sheet 2
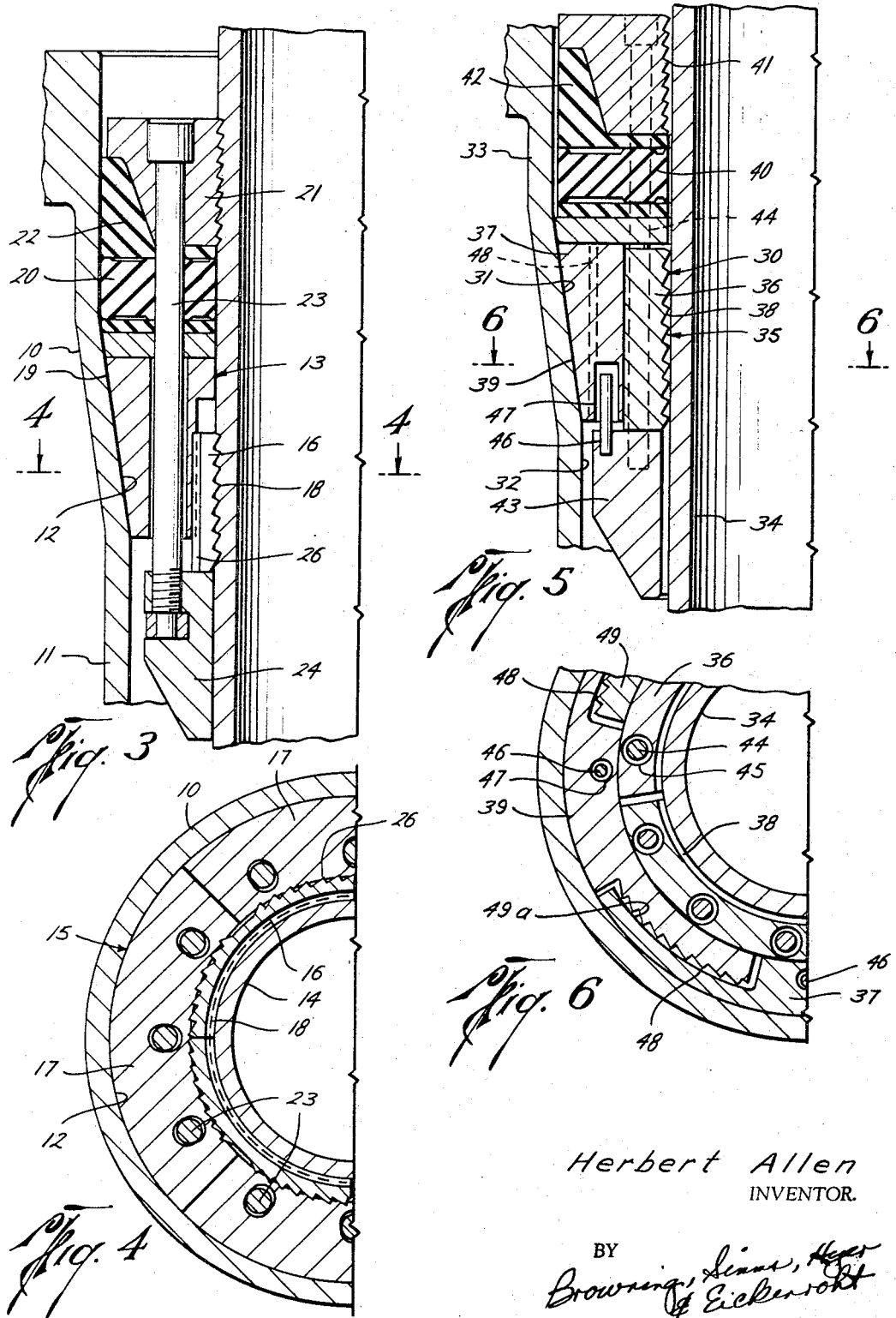
Herbert Allen
INVENTOR.
BY
ATTORNEYS July 4, 1967  H. ALLEN  3,329,448
PIPE HANGING APPARATUS
Filed Aug. 24, 1964  3 Sheets-Sheet 3

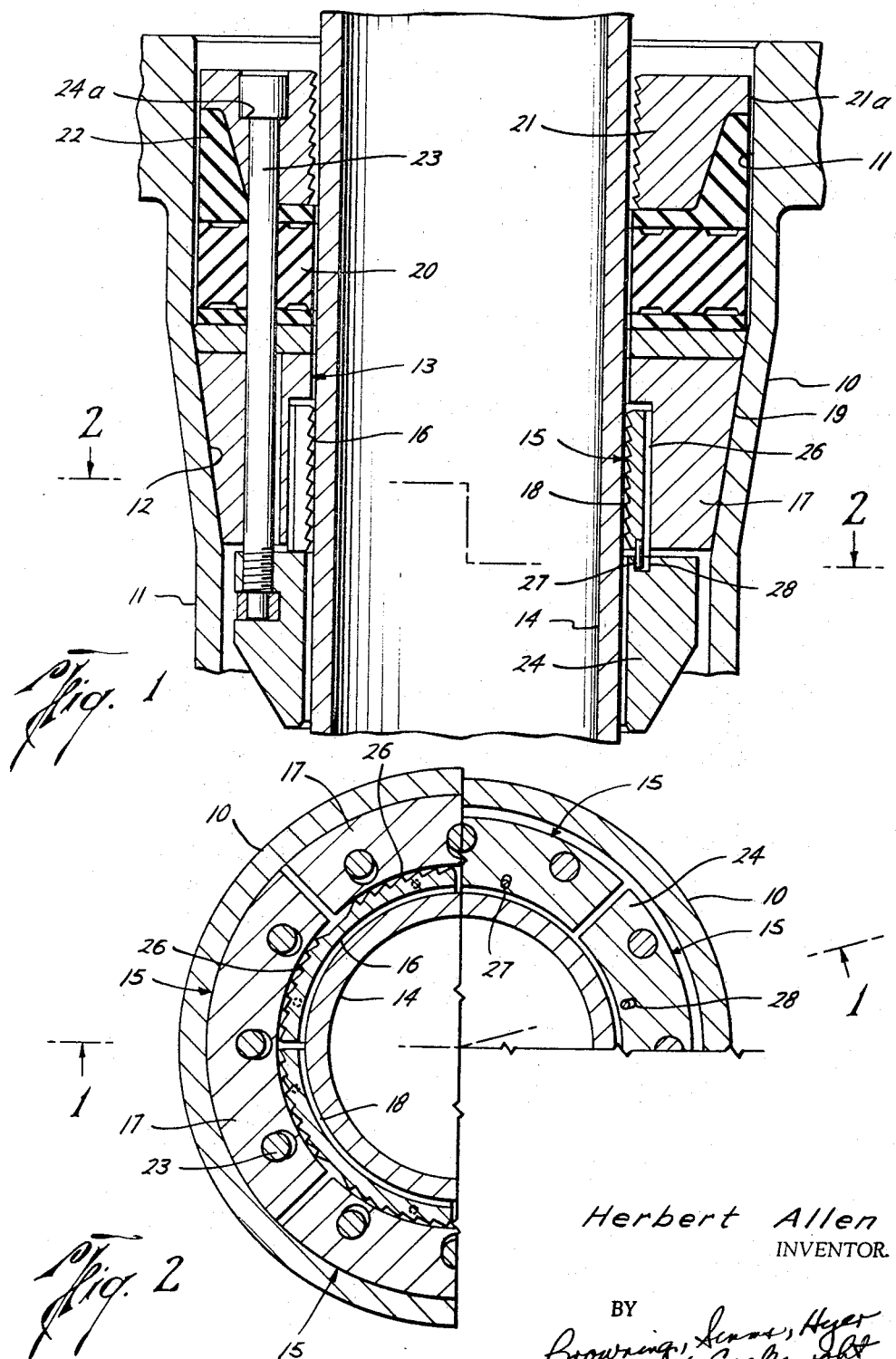

Herbert Allen
INVENTOR.

BY Browning, Simms, Hyer & Eickenroht
ATTORNEYS

United States Patent Office 3,329,448
Patented July 4, 1967

3,329,448
PIPE HANGING APPARATUS
Herbert Allen, Houston, Tex., assignor to Cameron Iron
Works, Inc., Houston, Tex., a Texas corporation
Filed Aug. 24, 1964, Ser. No. 391,653
14 Claims. (Cl. 285—147)

This invention relates generally to apparatus for hanging pipe, and more particularly, to improvements in slip type apparatus for hanging pipe from a conical seat. In one of its novel aspects, this invention relates to improved slip type hangers for suspending casing from a conical bowl within the head of an oil or gas well.

In a hanger of the type above mentioned, a series of slip means are arranged in circumferentially spaced apart relation to form an annular body or assembly which may be disposed about the casing above the conical seat or bowl within a casing head. These slip means have outer conical surfaces corresponding to the bowl and inner cylindrical surfaces with teeth thereon concentric with the outer surfaces so that when the outer surfaces of the slip means land on the bowl and slide downwardly therealong, the teeth on their inner surfaces are moved radially inwardly to grip the casing. As the weight of the casing is slacked off onto the slip means, the load thereof is transmitted to the outer surfaces of the slip means to cause the slip means to move further downwardly along the bowl and thereby grip the casing more firmly.

In its more conventional form, each such slip means comprises a single arcuate slip element or body such that the inner and outer surfaces move in unison and the load of the casing is transmitted directly from the teeth to the conical surface on such element. In another form, such as that shown in U.S. Patent No. 3,011,806, each such slip means comprises a first arcuate slip element which has the outer conical surface thereon and a second arcuate slip element which has teeth on the inner cylindrical surface thereof and is supported from the first slip element with its outer surface facing oppositely to the inner surface of said first element. More particularly, the second element is suspended from the first in such a way that it is free to move downwardly with respect thereto and thereby automatically energize a packing supported by such first element so as to seal off the annular space between the casing and bore of the well head in which the bowl is located.

Thus, in this second-mentioned form of slip means, the inner surface of the first element will bear upon the outer surface of the second element to urge the teeth on the latter into engagement with the pipe as the outer conical surface of the second element slides down along the bowl. When the load of the casing is slacked off, the suspension of the second slip element from the first will transmit such load to the first and cause it to slide further along the bowl and thereby force the teeth more firmly into engagement with the casing.

With the completion of deeper wells, and thus the need for suspending longer casing strings, it was found that the load of the casing was so great that the slip means often created a radial force large enough to crush the pipe, or at least deform it to such an extent that its bore would not accommodate various well tools designed for passage through it. One possible solution to this problem was to reduce the relatively steep angle of the taper on the conical outer surfaces of the slip means and conical bowl over which they slide. However, in order to accomplish this and at the same time not reduce the area of the teeth on the inner surfaces of the slip means, the slip means would necessarily have had to be made thicker. This would have created a serious problem in the case of a wellhead where radial dimensions of the bore therethrough must be kept to a minimum in order to avoid the necessity of having to seal the well pressure against larger areas.

Thus, it was proposed to solve this problem by providing the outer surfaces of the slip means making up such casing hangers with roughened surfaces, and preferably with circumferentially or horizontally extending teeth, to grip the conical seat or bowl in order to limit sliding of the slip means therealong. More particularly, these teeth or other friction producing parts on the outer surfaces of the slip means were made blunter than the casing gripping teeth on the inner cylindrical surfaces of the slip means, so that they permitted the slip means to slide far enough to securely grip the casing before limiting such sliding.

One problem which has resulted from these last-mentioned hangers is that since the teeth on the outer surfaces of the slip means bite into the bowl, they destroy its usefulness in a subsequent hanging operation. That is, they form permanent indentations or steps in the conical surface of the bowl so that the teeth on the outer surfaces of the slip means of another hanger have no smooth taper with which to cooperate in suspending the casing.

Still further, it is often the practice in hanging casing with apparatus of this type to place added tension within the suspended portion thereof. This involves raising and lowering the casing to cause it to be gripped by the slip means at a lower position thereon. It is almost inevitable that the hanger will be raised at least some distance with the casing, and when the weight of the casing is slacked off, it is possible that the outer teeth will not return to landed positions on the same steps formed in the bowl. Thus, for example, they may have been moved up one or more steps so that the slip means are incapable of gripping the casing as securely as before due to the fact that there is no force tending to move them downwardly to their former positions.

An object of this invention is to provide slip type apparatus of the type above described which is especially well suited for use in hanging well casing in that it effectively limits the radial force to be exerted by the slip means on the casing without, at the same time, either increasing the radial dimensions of the bore of the wellhead or interfering with the resetting of the hanger.

Another object is to provide such apparatus in which this radial force is limited by friction control surfaces on the slip means which are so arranged and located that they do not engage the seat or bowl in the wellhead.

A further object is to provide apparatus of this type which is of compact and inexpensive construction.

These and other objects are accomplished, in accordance with the illustrated embodiments of the invention, by apparatus of the type above described in which each slip means has a surface intermediate its toothed inner surface and conical outer surface which is opposite to an intermediate surface on an adjacent slip means and which has friction means such as vertical teeth thereon for gripping such opposite surface to resist movement of the various slip means circumferentially toward one another. More particularly, these opposite surfaces are provided on an arcuate portion on each slip means overlapping an arcuate portion of an adjacent slip means, and each is curved concentrically of the inner cylindrical and outer conical surfaces of the slip means.

The effect of these vertical teeth is to limit the circumferential contraction of the slip means which in turn limits the inward radial force exerted on the casing by such slip means, without the necessity of radially enlarging the bore of the wellhead. At the same time, this is accomplished without defacing the casing head bowl, so that this or other casing may be suspended from the same bowl with this or another hanger. In fact, this same hanger may be reset since the tapered surfaces are still active to produce a force that will move the friction control teeth back to their original position in the grooves formed in the opposite intermediate surface.

In certain embodiments of the invention, each slip means comprises inner and outer slip elements of the general character above mentioned. In one such embodiment, the intermediate surfaces are formed on the outer slip element of one slip means and the inner slip element of an adjacent slip element. In another such embodiment, intermediate surfaces are formed on the outer slip elements of adjacent slip means. In still another embodiment of the invention, each slip means comprises a single slip element having both a portion to overlap a portion of one adjacent slip element and a portion to be overlapped by a portion on the other adjacent slip element.

In the drawings, wherein like reference characters are used throughout to designate like parts;

FIG. 1 is a vertical sectional view, as seen along broken line 1—1 of FIG. 2, of a casing hanger constructed in accordance with the first described embodiment of the present invention and landed on the bowl of a wellhead and about a casing and with the parts thereof shown in the positions they occupy prior to the time the load of the casing is slacked off;

FIG. 2 is a partial cross-sectional view of the hanger, wellhead and casing shown in FIG. 1, and as seen along broken line 2—2 of FIG. 1;

FIG. 3 is a half vertical sectional view of the hanger, wellhead and casing of FIGS. 1 and 2, but showing the parts thereof in the positions they occupy after the load of the casing has been slacked off and the teeth on the inner surfaces of the slip means of the hanger have bitten into the casing to transmit its load to the outer conical surfaces of the slip means;

FIG. 4 is a half cross-sectional view of the hanger, wellhead and casing of FIGS. 1 to 3, as seen along broken line 4—4 of FIG. 3.

FIG. 5 is a half vertical sectional view of a casing hanger constructed in accordance with the second described embodiment of the present invention and landed on the bowl of a wellhead and about a casing prior to the slacking off of the casing;

FIG. 6 is a half cross-sectional view of the hanger, wellhead and casing shown in FIG. 5, as seen along broken line 6—6 of FIG. 5;

Figure 7:
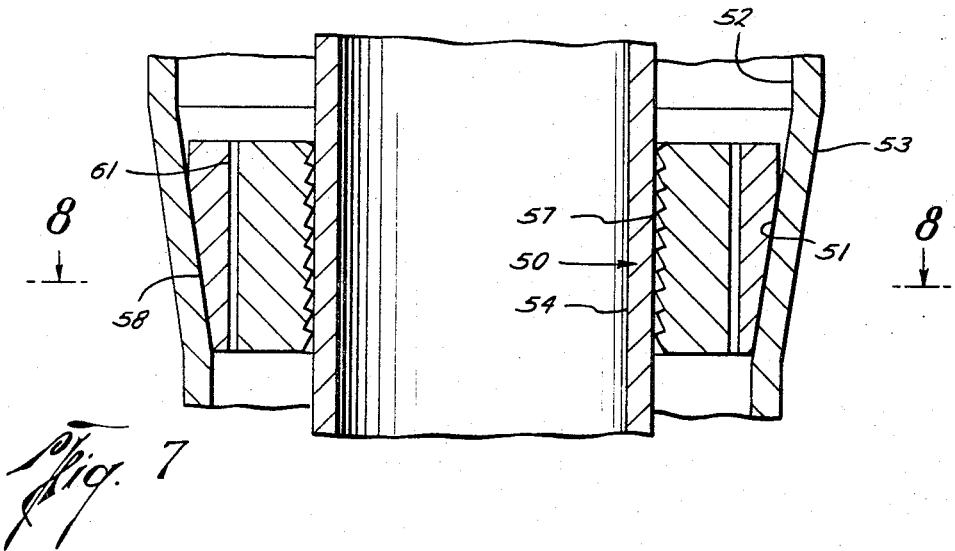
Figure 8:
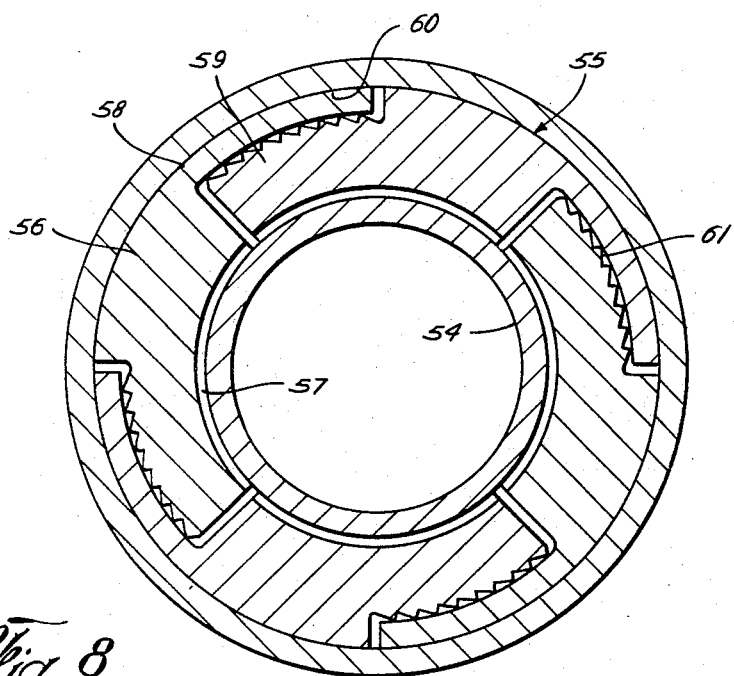

FIG. 7 is a vertical sectional view of a casing hanger constructed in accordance with the last described embodiment of the present invention, and, as in the case of FIGS. 1 and 5, showing such hanger landed upon a bowl of a wellhead and about a casing prior to the time the load of the casing is slacked off; and FIG. 8 is a cross-sectional view of the hanger, wellhead and casing of FIG. 7, as seen along broken line 8—8 thereof.

With reference now to the details of the above described drawings and particularly the embodiment of the invention shown in FIGS. 1 to 4, there is a casing head 10 having a bore 11 therethrough and a conical bowl 12 within the bore. As can be seen from FIGS. 1 and 3, the upper end of the bore 11 is enlarged so that the bowl provides an upwardly facing seat to support a slip type hanger 13 for suspending a casing 14. As well known in the well art, the casing head 10 is connected to the upper end of an outer casing (not shown), and the casing 14 is lowered into the outer casing and suspended from a suitable hoist above the casing head 10. With the casing so suspended, the hanger is wrapped about the casing 14 and lowered thereabout onto the bowl 12 so that teeth on the inner side thereof are forced into engagement with the casing. When the weight of the casing 14 is slacked off, it is gripped tightly by these teeth and a packing carried by the hanger is energized so as to seal off the annular space between the casing and the bore 11 of the casing head, all in a manner to be described hereinafter.

As above described, the casing hanger 13 of this first embodiment of the invention comprises a plurality of circumferentially spaced apart slip means 15, each of which includes an inner slip element 16 and an outer slip element 17. Each inner slip element has circumferentially or horizontally extending teeth 18 about its inner surface and each outer slip element has an outer conical surface 19 corresponding to the conical bowl 12 of the casing head. Thus, when the hanger 13 is landed on the bowl, as shown in FIG. 1, the outer surfaces 19 will slide along the bowl to force the teeth against the casing 14.

This casing hanger 13 corresponds to that shown and described in the aforementioned Patent No. 3,011,806 in that it includes an annular packing 20 supported above the outer slip element 17 for extension across the annular space between the casing head bore 11 and casing 14 and a plurality of spaced apart slip elements 21 supported above the packing. The upper slip elements 21 are carried within an L-shaped support member 22 whose lower side rests on the top of packing 20. Each of the packing and the support member 20 and 22 are formed of a deformable material so that in the suspension of the casing from the slip means and as described in such earlier patent, the packer 20 is caused to expand radially to seal between the casing head bore and the casing and the upper slip elements are caused to move inwardly into engagement with the casing. For this purpose, each of the inner slip elements 16 is supported from an outer slip element 17 by means of a ring 24 suspended by rods 23 connected at their lower end to the ring 24 and extending upwardly through the outer slip elements, the packer 20 and the upper slip elements 21 for support from the latter. Thus, as shown in FIG. 1, the upper end of rod 23 is enlarged to rest upon an upwardly facing annular shoulder 24a, of each of the upper slip elements 21.

In the operation of this hanger, and upon landing of outer slip elements 17 upon the bowl 12, the outer conical surfaces 19 on such slip element will slide downwardly along the bowl to force the teeth 18 on the inner slip elements 16 against the casing. During this landing of the hanger and initial setting of the teeth 18 against the casing 14, there will be little or no downward movement of the inner slip elements relative to the outer slip elements since there has been only small deformation of the packing 20 and support member 22. That is, up until this time, there has been no weight imposed on the inner slip elements 16, and thus no load imposed upon upper slip elements 21 which would impose a downwardly directed force on the packer 20 and support member 22, other than the weight of the slip elements.

However, when the weight or load of the casing 14 is slacked off, the teeth 18 of the inner slip elements will be wedged inwardly to bite into the casing, as shown in FIG. 3. The inner slip elements 16 will move downwardly relative to the outer slip elements 17 which are supported against downward movement by the bowl 12. This downward movement of the inner slip elements relative to the outer slip elements will, of course, move the upper slip elements 21 downwardly relative to the packing 20 and support member 22. As a result, and as also shown in FIG. 3, the packing 20 is deformed radially into sealing engagement with the bore 11 of the casing head and the casing 14.

As described in the aforementioned patent, the upper slip elements have teeth on their inner surfaces and are caused to be moved into engagement with the casing to assist the slip means in supporting same. More particularly, the slip elements 21 include an outwardly projecting flange 21a disposed above the upwardly extending portion of the L-shaped support member 22, so that this latter portion will be deformed radially inwardly to force the inner surfaces of slip elements 21 toward the casing. Thus, upon continued loading of the inner slip elements 16, the teeth on the inner surfaces of the slip elements 21 are moved into biting engagement with the casing, as shown in FIG. 3, so that when the casing is fully suspended from the casing hanger 13, its load is distributed over the slip elements 16 and 21.

As previously described, however, the weight of the casing may be of such magnitude as to cause the inner slip elements 16 to engage the casing 14 with a force which might crush or at least deform the casing 14. In order to limit this force, each slip element 16 extends laterally across the circumferential separation between the outer slip elements 17 of adjacent slip means 15 and has vertical teeth 26 on its outer surface engageable with the inner surfaces of both of such outer slip elements 17. Thus, in the assembled hanger, each inner slip element 16 provides one slip means 15 with a laterally extending arcuate portion overlapping an arcuate portion of the inner surface on an outer slip element 17 of an adjacent slip means.

The vertical teeth 26 on the outer surfaces of the inner slip elements 16 will bite into the inner surfaces on the adjacent outer slip elements 17 as the teeth 18 on the inner surfaces of the inner slip elements bite into the casing 14. As the teeth 26 so engage with the inner surfaces of the outer slip elements, they will permit only limited movement of such outer slip elements circumferentially toward one another as they slide downwardly along the casing head bowl 12.

The teeth 26 preferably provide less friction than the pipe gripping teeth 18, so as to insure sufficient penetration of the teeth 18 to securely grip the casing 14 prior to limiting of the movement of the outer slip elements 17 circumferentially toward one another. This relationship between the teeth 26 and teeth 18 may be accomplished in a number of ways, such as by blunter crests on the teeth 26 or by the provision of a greater number of teeth 26 than teeth 18.

As previously described, the effect of this limiting of the circumferential movement of the outer slip elements 17 will be to limit the downward sliding movement of the conical surface 17 over the conical bowl 12. Since it is this downward movement of the outer conical surface which in turn transmits an inwardly directed force to the teeth 18, such limit on the downward movement of the outer slip elements effectively limits the inwardly directed force due to the inner slip elements. However, it does so in a way which requires no engagement of the friction control teeth 26 with the bowl 12. Thus, for example, if it should be desired to pull an additional strain on the casing 14, such casing need only be lifted so as to in turn lift the casing hanger 13 from the position of FIG. 3. Although this will ordinarily move the friction control teeth 26 relative to the oppositely facing surface which they engage, the subsequent slacking off of the load of the casing will merely cause such teeth to move back into the vertical slots which they formed in the inwardly facing surface of the outer slip elements 17. Furthermore, upon removal of the casing hanger 13, the casing 14 can be set by a similar hanger inasmuch as the bowl 12 is unmarked—i.e., it retains its smooth conical surface so that a similarly shaped surface 19 of another casing hanger 13 may move downwardly therealong in a subsequent setting of the other casing hanger.

The outer slip elements 17 are held in vertical alignment with respect to the ring 24 by means of the rods 23. Each inner slip element 16 is held in vertical alignment with respect to the ring 24, and thus with respect to adjacent outer slip elements, by means of a pin 27 extending downwardly from the lower end for radial movement within a radially extended slot 28 on the upper surface of the ring 24.

As well known in the art, this sort of a casing hanger is normaly split about its circumference to permit it to be swung into a position for wrapping about the casing, at which time it is merely permitted to slide downwardly along the casing onto the bowl 12. The details of the construction of the hanger for this purpose are well known and may be similar to that shown, for example, in the aforementioned Patent No. 3,011,806.

A casing hanger 30 made in accordance with the second embodiment of the invention is shown in FIGS. 5 and 6 to be landed on a conical bowl 31 within the bore 32 of a tubing head 33 for suspending casing 34 from such head within an outer casing (not shown) to which the casing head 33 is connected. The casing hanger 30 is of the same general type as the casing hanger 13 shown in FIGS. 1 to 4 in that it comprises circumferentially spaced apart slip means 35 each including inner and outer arcuate slip elements 36 and 37, respectively. Also, and again as in casing hanger 13, the inner cylindrical surfaces of slip element 36 have teeth 38 extending horizontally thereof for gripping the casing, and the outer surfaces 39 of slip elements 37 have conical shapes corresponding to that of the bowl 31, whereby the teeth 36 are forced radially inwardly into engagement with the casing as the outer slip elements 37 slide downwardly and inwardly along the bowl.

As was also the case of hanger 13, the hanger 30 shown in FIGS. 5 and 6 includes an annular packer 40 supported above outer slip elements 37 and circumferentially separated upper slip elements 41 supported above the packer. More particularly, the upper slip elements are mounted upon an L-shaped annular support member 42 which, similarly to the packer 40, is of a deformable material, so that as explained in connection with hanger 13, upon downward movement of the upper slip elements 41 relative to outer slip elements 37, the packer 40 is expanded into sealing engagement between the casing 34 and casing head bore 32 and the upper slip elements are caused to move radially inwardly into engagement with the casing.

As was still further the case with hanger 13, the inner slip elements 36 of hanger 30 are supported upon a ring 43 which is suspended from rods 44 supported at their upper ends from the upper slip elements 41. Thus, the inner slip elements 36 are free to move downwardly with respect to the outer slip elements 37 as the weight of the casing 34 is slacked off, and this downward force is transmitted to the ring 43 and thus to the upper slip elements 41 for the purposes previously described.

In the hanger 30, however, the rods 44 extend through recesses 45 on the outer sides of inner slip elements 36 so that they serve to vertically align the inner slip elements with respect to the support ring. The outer slip elements 37 are also aligned with respect to the ring 43, and thus with respect to the inner slip elements 36, by means of pins 46 which project upwardly from the ring and into slots 47 formed in the lower ends of outer slip elements 37. As can be seen from FIGS. 5 and 6, these pins have some radial play within the slots so that they do not interfere with the radial movement of the outer slip elements 37 relative to the ring.

This hanger 30 also differs from the hanger 13 in that the cylindrical outer surfaces of the inner slip elements 36 are smooth. Thus, in hanger 30, the circumferential movement of the slip means 35 toward one another is limited by vertical teeth 48 on an outer surface of one outer slip element of each such slip means engageable with an opposite surface of an outer slip element of an adjacent slip means. More particularly, and as shown in FIG. 6, each such outer slip element has a laterally extending arcuate flange 49 which overlaps a recessed arcuate portion 49a of an adjacent outer slip element, and the vertical teeth 48 are formed on a cylindrical surface of the flange 49 opposite a smooth cylindrical surface on the recessed portion 49a. Thus, as the various slip means land upon and slide downwardly over the bowl 31 of the casing head, and the teeth 38 move into gripping engagement with the casing 34, the teeth 48 are caused to engage the cylindrical surface of a recessed portion 49a so as to limit further sliding of the outer slip elements 37 and thus limit further inward radial movement of the inner slip elements 36.

A casing hanger 50 constructed in accordance with the third embodiment of the invention is shown in FIGS. 7 and 8 to be landed upon a bowl 51 within the bore 52 of a casing head 53 for suspending a casing 54 from such head. The circumferentially spaced apart slip means 55 each comprises a single arcuate slip element 56 having teeth 57 on its inner cylindrical surface to grip the casing and an outer conical surface 58 corresponding to the bowl 51 for sliding downwardly and inwardly thereon. As previously described, in this type of hanger, the weight of the casing is transmitted directly from the teeth 57 to the conical surfaces 58 of the slip elements to cause them to slide down along the bowl 51.

In this hanger 50, the circumferential movement of the slip elements toward one another is limited in much the same manner that the corresponding movement of outer slip elements 37 of hanger 30 is limited. That is, each slip element 56 has a laterally extending arcuate flange 59 which overlaps a recessed arcuate portion 60 on an adjacent slip element, and vertical teeth 61 are formed on one of the two otherwise cylindrical opposite surfaces provided by these arcuate flanges and recessed portions for engagement with the other said surfaces. As in the case of hanger 13, the vertical teeth 48 of the hanger 30 and the vertical teeth 61 of the hanger 50 are preferably so related to the pipe gripping teeth 38 and 57, respectively, as to insure a firm gripping of the casing to be suspended before limiting of the circumferential movement of the slip means toward one another. Thus, as described in connection with casing hanger 13, these vertical teeth are preferably capable of producing less friction than the pipe gripping teeth, as by means of a greater number or by means of a flatter or blunter crests.

In the illustrated embodiments of the invention, the vertical teeth are formed on the outwardly facing surfaces of each pair of opposite surfaces. However, it is quite obvious that they could instead be formed on the inwardly facing surfaces.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for hanging a pipe from a conical seat, comprising slip means disposable in circumferentially spaced apart relation about the pipe above the seat, each slip means having an outer conical surface for landing on the conical seat and an inner cylindrical surface with means thereon for gripping the pipe and transmitting the load thereof to the outer surface of said slip means so as to cause it to slide inwardly and downwardly along said seat, an intermediate surface on each slip means opposite an intermediate surface on an adjacent slip means, and friction means on one of said intermediate surfaces for gripping said opposite intermediate surface to limit movement of said intermediate surfaces circumferentially along one another during sliding of said slip means downwardly along said seat.

2. Apparatus of the character defined in claim 1, wherein said friction means comprises vertical teeth.

3. Apparatus for hanging a pipe from a conical seat, comprising slip means disposable in circumferentially spaced apart relationship about the pipe above the seat, each slip means comprising an outer slip element having an outer conical surface thereon for landing on the conical seat, an inner slip element having an inner cylindrical surface for gripping the pipe and supported from the outer slip element in position to be engaged by the outer slip element to urge the inner slip element against pipe, and means for limiting movement of said slip means circumferentially toward one another as the outer slip element slides inwardly and downwardly along the seat, said means including an intermediate surface on a slip element of each slip means opposite an intermediate surface on a slip element of an adjacent slip means, and friction means on one of said intermediate surfaces for gripping said opposite intermediate surface to limit movement of said intermediate surfaces circumferentially along one another during sliding of said outer slip elements downwardly along said seat.

4. Apparatus of the character defined in claim 3, wherein said friction means comprises vertical teeth.

5. Apparatus of the character defined in claim 3, wherein the intermediate surfaces are formed on the outer slip elements of adjacent slip means.

6. Apparatus of the character defined in claim 3, wherein the intermediate surfaces are formed on the outer slip element of one slip means and the inner slip element of an adjacent slip means.

7. Apparatus for hanging a pipe from a conical seat, comprising slip elements disposable in circumferentially spaced apart relation about the pipe above the seat, each slip element having an outer conical surface thereon for landing on the conical seat and an inner cylindrical surface for gripping the pipe and transmitting the load thereof to the outer surfaces of the slip elements so as to cause said slip elements to slide downwardly and inwardly along said seat, each slip element having an intermediate surface opposite an intermediate surface on an adjacent slip element, and friction means on one of said intermediate surfaces for gripping the other opposite intermediate surface to limit movement of said intermediate surfaces circumferentially along one another during sliding of said slip elements downwardly along said seat.

8. Apparatus of the character defined in claim 7, wherein said friction means comprises vertical teeth.

9. Apparatus for hanging a pipe from a conical seat, comprising circumferentially spaced apart slip means disposable about the pipe above the seat, each slip means having an outer conical surface corresponding to the seat for sliding downwardly and inwardly therealong, an inner cylindrical surface which is concentric to the outer conical surface and has means thereon to grip the pipe and thereby transmit the load of said pipe to said outer conical surface, and an arcuate portion which overlaps laterally with an arcuate portion of an adjacent slip means to provide oppositely facing surfaces which are curved concentrically of said conical and cylindrical surfaces, one of said oppositely facing surfaces having friction means thereon for gripping the other oppositely facing surface so as to limit movement of said oppositely facing surfaces circumferentially along one another during sliding of said slip means along said seat.

10. Apparatus of the character defined in claim 9, wherein said friction means comprises vertical teeth.

11. Apparatus of the character defined in claim 9, wherein each slip means comprises an outer slip element having the conical surface thereon, and an inner slip element supported by the outer slip element and having the pipe gripping means thereon, the outer slip element of each slip means having said arcuate portion to overlap said arcuate portion of an adjacent outer slip element and said arcuate portion to be overlapped by said arcuate portion on the other adjacent outer slip element.

12. Apparatus of the character defined in claim 9, wherein each slip means comprises a single slip element having a flange to overlap an arcuate portion of an adjacent slip element and an arcuate portion to be overlapped by a portion of the other adjacent slip element.

13. Apparatus of the character defined in claim 9, wherein each slip means comprises an outer slip element having the conical surface thereon, and an inner slip element supported by the outer slip element and having the pipe gripping means thereon, the inner slip element of each slip means having said arcuate portion to overlap said arcuate portion of the outer slip element of an adjacent slip means.

14. Apparatus of the character defined in claim 13, wherein said inner slip element of each slip means has arcuate portions to overlap arcuate portions of outer slip elements of both adjacent slip means.

References Cited

UNITED STATES PATENTS

| | | | |
|---|---|---|---|
| 1,326,272 | 12/1919 | Kinzbach | 24—263.5 X |
| 1,547,543 | 7/1925 | Welty | 24—263.5 X |
| 1,559,932 | 11/1925 | Bogen | 24—263.5 |
| 1,794,662 | 3/1931 | Zerr | 285—144 X |
| 2,824,757 | 2/1958 | Rhodes | 285—147 X |
| 2,874,436 | 2/1959 | Allen | 285—146 X |
| 2,920,909 | 1/1960 | Allen | 285—147 X |
| 3,096,554 | 7/1963 | Johnson | 285—147 X |

CARL W. TOMLIN, *Primary Examiner.*

D. W. AROLA, *Assistant Examiner.*